United States Patent [19]
McCabe

[11] 3,939,649
[45] Feb. 24, 1976

[54] FUEL CONTROL
[75] Inventor: Ralph P. McCabe, Forest Park, Ohio
[73] Assignee: Chandler Evans Inc., West Hartford, Conn.
[22] Filed: Nov. 8, 1972
[21] Appl. No.: 304,622

Related U.S. Application Data
[62] Division of Ser. No. 111,294, Feb. 1, 1971, Pat. No. 3,712,055.

[52] U.S. Cl.......... 60/39.28 R; 60/39.16 R; 277/30; 60/39.14
[51] Int. Cl.²......................................... F02C 9/08
[58] Field of Search . 60/39.28 R, 39.28 T, 39.16 R, 60/39.2; 415/26, 17, 30, 47, 48

[56] References Cited
UNITED STATES PATENTS
| | | | |
|---|---|---|---|
| 2,929,252 | 3/1960 | Evers | 60/39.28 R |
| 3,050,941 | 8/1962 | Rogers | 60/39.28 R |
| 3,446,015 | 5/1969 | Kimmel | 60/39.28 R |
| 3,521,446 | 7/1970 | Maljanian | 60/39.28 R |

Primary Examiner—Clarence R. Gordon
Attorney, Agent, or Firm—Radford W. Luther; Richard A. Dornon

[57] ABSTRACT

A hydromechanical fuel control for a turboshaft engine includes a gas producer control and an independent power turbine governor in series flow relationship. The basic gas producer control includes an acceleration system, a deceleration system and all speed governor to regulate the fuel flow output of the gas producer control. The acceleration system includes a main metering valve which is positioned by a compressor discharge pressure responsive device and the all speed governor. A speed responsive computer mechanism controls the head across the metering valve. The computer mechanism includes an enrichment valve and a start valve and is connected to the shut-off valve lever for the fuel control in such a manner that the mechanism may be controlled by actuation of this lever. The power turbine governor includes a fuel flow reset governor and a deceleration system to prevent flameouts. The fuel control and power turbine each have separate input levers and meter fuel to the engine in accordance with the lowest demanded fuel flow.

3 Claims, 11 Drawing Figures

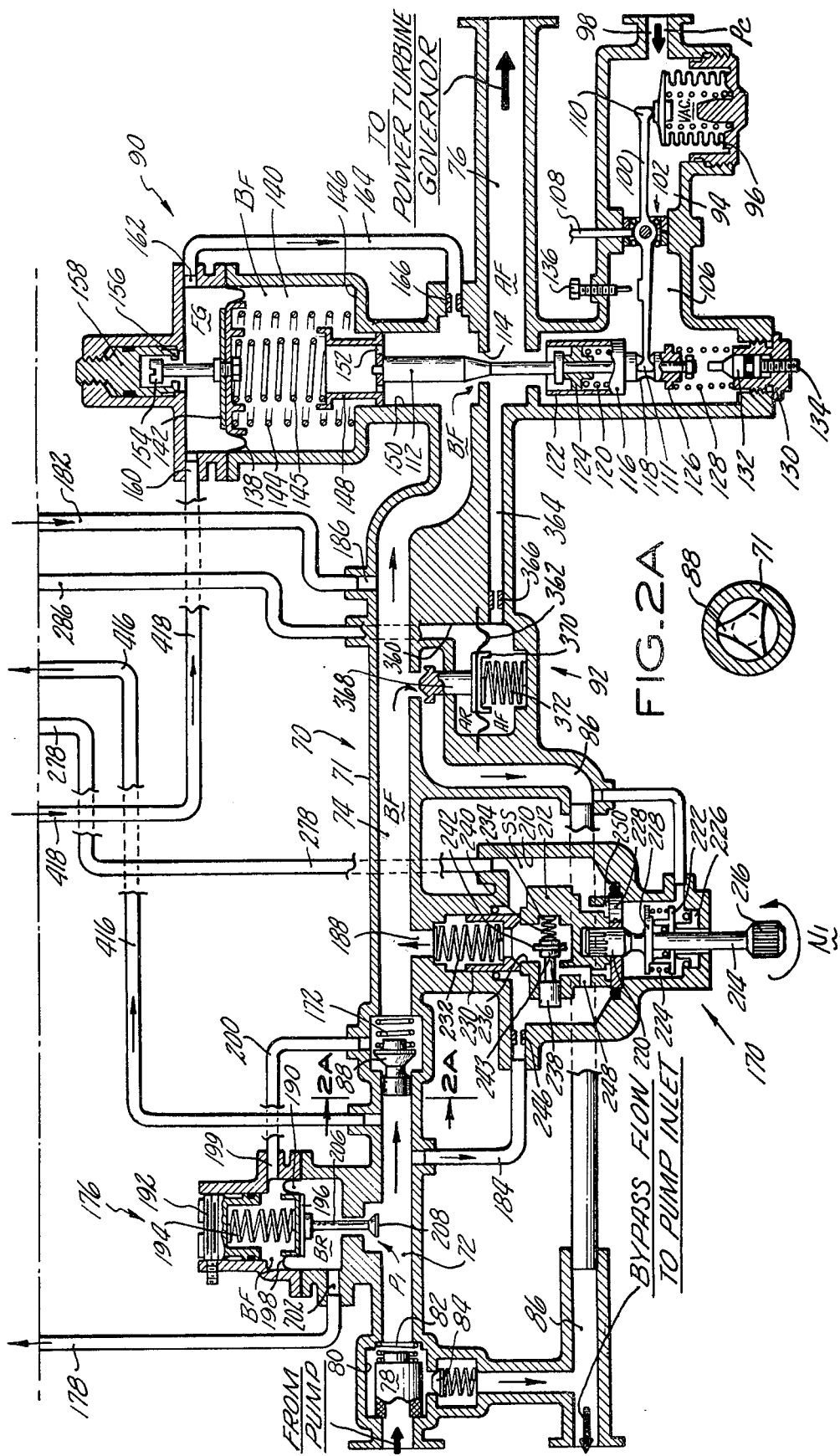

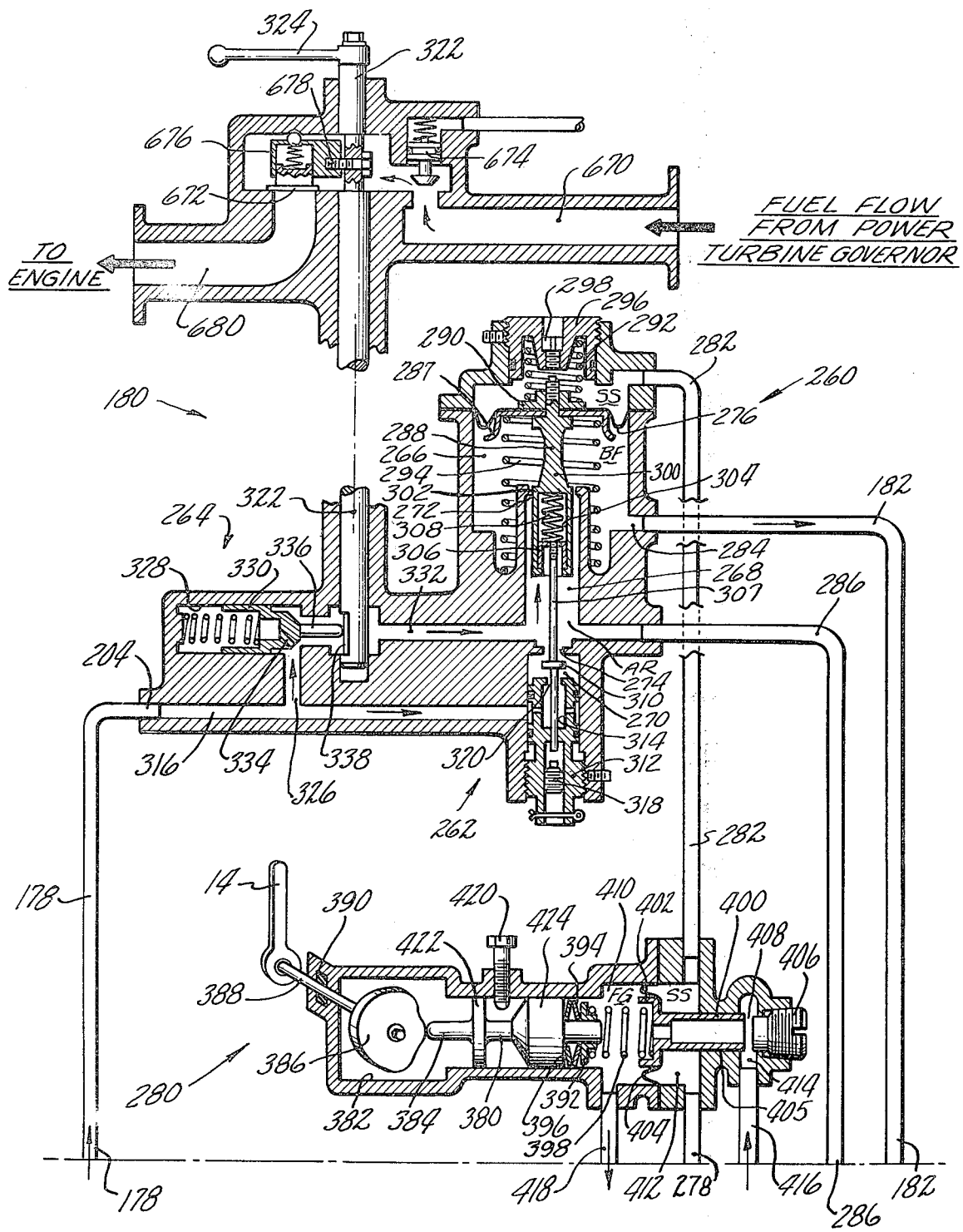

FUEL CONTROL

This is a division of application Ser. No. 111,294, filed Feb. 1, 1971, now U.S. Pat. No. 3,712,055.

BACKGROUND OF THE INVENTION

The invention generally relates to fuel controls and more particularly to fuel controls for turboshaft engines. This application has matured into U.S. Pat. No. 3,721,453. In the past, fuel controls have embodied various devices to produce fuel flow acceleration schedules for their associated engines. Notable among these prior art devices is the well-known three-dimensional cam. While prior controls, incorporating three-dimensional cams, yield satisfactory performance, they are relatively expensive to manufacture. Additionally, prior art fuel systems have not always been endowed with the requisite degree of flexibility necessary to meet the requirements of small gas turbine engines. Also, prior art fuel controls for turboshaft engines incorporating a gas producer control and a power turbine governor are characterized by the fact that the functioning of one unit is dependent upon the functioning of the other unit. This type of design not only limits the flexibility of the fuel control, but also detracts from operating characteristics thereof.

Prior art control system with speed governors usually employ a spring to transmit a force which corresponds to a requested speed. Typically, a cam contoured throttle level shaft contacts an end of the spring while the other end is applied to a speed sensitive element which may be a set of flyweights or a pressure diaphragm element of a hydraulic speed sensor. This arrangement has the disadvantage of producing a governor having a high spring rate which has an adverse effect on the governor's speed holding accuracy. Furthermore, a high spring rate causes a substantial reaction force on the throttle level, thereby promoting wear, increasing throttle torque, and tending to return the throttle to a low speed setting in the event of a throttle linkage failure.

Also, prior art governors, which do not include an integrating feature, have not provided for isochronous or constant speed operation during steady state operation at various ambient temperatures and altitudes. Neither a conventional corrected speed nor actual speed droop governors are capable of maintaining engine speed in such a manner. It is highly desirable to have a fuel control system which is adapted to maintain a constant gas producer speed, irrespective of changes in ambient temperature and altitude since it allows a pilot to set an unvarying gas producer speed.

SUMMARY OF THE INVENTION

The gas producer control and the power turbine governor of the fuel control of the invention are in series flow relationship so that each unit performs independently of the other. This feature not only lends a high degree of flexibility to the fuel system, but also makes a substantial contribution to the fail-safe characteristics of the control. The power turbine governor and the gas producer governor have separate bypass circuits to forestall the overfueling of the engine, which could otherwise be caused by the failure of one governing system. Because of this independent design approach, there is no single diaphragm failure which would cause a reduction in fuel flow. The only occurrence in the gas producer control and power turbine governor which would result in a reduction of fuel flow would be a blocking of the fuel passage with a contaminant.

The apparatus which senses the compressor discharge pressure ($P_c$) has a relatively high spring rate, thereby permitting the bellows selected to be rated well above the pressure which it will be subjected to. Also, the high rate required allows the selection of bellows whose rate is high enough to prevent resonant frequency throughout the vibration spectrum.

Another feature of a fuel control of the invention is that the flexing members, such as the bellows and springs, may be designed within the limits of infinite service.

Further, in a fuel control of the invention, force levels remain relatively constant, that is, they are independent of compressor discharge pressure, thereby enhancing the accuracy of the control.

Also, problems are avoided by minimizing friction with the use of diaphragms, inline design and flexure pivots.

Briefly stated, the basic gas producer control includes an acceleration system comprising a computer mechanism, a deceleration system, and an all speed governor to regulate the output of the basic gas producer control of the fuel control in accordance with the demands imposed thereupon. The power turbine governor is an all speed governor which regulates the speed of the power turbine, as demanded, by further metering the fuel flow to the engine from the gas producer control. The gas producer control and power turbine governor are each provided with separate input levels. The input level calling for the least power will dictate the output fuel flow of the fuel control. The fuel control responds to four input parameters, viz.: compressor discharge pressure ($P_c$); gas producer speed ($N_1$); Power turbine speed ($N_2$); the power lever inputs (PlA), and regulates fuel flow to the engine as needed for the required output power. The heart of the gas producer control's acceleration system is a metering valve, which is positioned in accordance with compressor discharge pressure ($P_c$).

A computer mechanism, responsive to the speed of the gas producer, controls the pressure differential across the metering valve to schedule fuel flow. The differential pressure, maintained by the computer mechanism, is a function of the gas producer speed ($N_1$) and therefore, compressor discharge pressure as biased by the gas producer speed. The computer mechanism includes a manual means to vary the differential pressure produced thereby to facilitate starting operations.

The basic elements of the power turbine governor are a speed setting mechanism, a fuel flow reset governor valve, and the bypass valve. The reset governor valve has a signal applied thereto which is indicative of speed error and the fuel flow change engendered by the positioning of the reset governor. The reset feature is incorporated in the governor valve so that the valve is positioned by speed error and repositioned by the reset means at a predetermined rate.

The invention provides a gas producer governor having a low force speed setting mechanism which converts throttle lever position to a pressure and is advantageous in that it enhances the accuracy of the governor and engenders a minimum throttle torque. Also, the governor of the invention is isochronous, for all practical purposes, since it holds a constant maximum set gas producer speed regardless of variations in altitude and temperature. This is achieved by a unique arrangement of springs acting on a metering valve which is additionally positioned by compressor discharge pressure.

It is a primary object of the invention to provide a reliable and inexpensive fuel control for a gas turbine engine.

Another object is to provide a fuel control having an acceleration schedule which is controlled by a relatively simple mechanism.

Still another object is to provide a computer mechanism for a fuel control wherein the mechanism is susceptible to manual control.

Still another object is to provide a fuel control for a turboshaft engine wherein the gas producer control and power turbine governor thereof function independently to enhance the reliability of the fuel control.

Still another object is to provide a gas producer control having a low force speed setting mechanism.

Still another object is to provide a gas producer control including a governor which maintains a substantially constant speed during steady state operation at various ambient temperatures and altitudes.

These and other objects will become more apparent from the following detailed description taken in conjunction with the accompanying drawings.

BRIEF DESCRIPTION OF THE DRAWINGS

FIG. 2 is a schematic illustration of a portion of the gas producer control.

FIG. 2A is a view of the muscles valve of FIG. 2, taken along the line 2A—2A.

FIG. 3 is a schematic illustration of another portion of the gas producer control.

DETAILED DESCRIPTION OF PREFERRED EMBODIMENT

GENERAL DESCRIPTION

Figure 1:
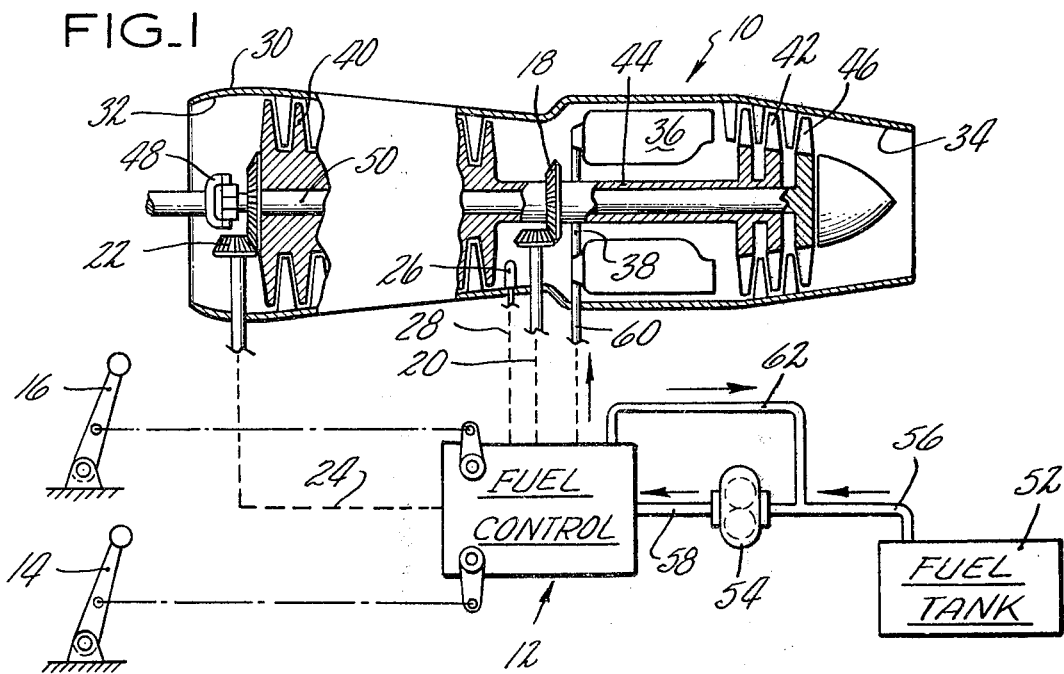
FIG. 1 is a schematic illustration of a turboshaft gas turbine engine associated with a fuel control having a gas producer control and a power turbine governor according to the invention.
Figure 8:
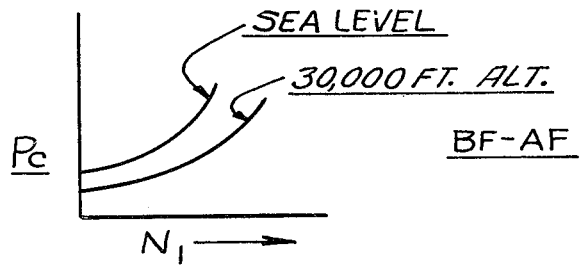
FIG. 8 is a graph illustrating typical variations in compressor discharge pressure with gas producer speed for various altitudes.

Referring now to the drawings in greater detail, and more particularly to FIG. 1, there is schematically illustrated a twin spool or turboshaft gas turbine engine 10 having a fuel control 12 which is responsive to manual control by means of a pair of power levers 14 and 16, to engine gas producer speed by means of a gear box 18 and transmission line 20, to power turbine engine speed by means of the gear box 22 and transmission line 24 and to compressor discharge pressure by means of a pressure probe 26 and 28. While the fuel control 12, described hereinafter, is responsive to particular parameters, namely: gas producer speed ($N_1$), power turbine speed ($N_2$), and compressor discharge pressure ($P_c$), it should be understood that certain novel features of the invention may be employed in a fuel control responsive to other parameters such as temperature and engine pressures other than those specified above. As to these features, no limitations are intended by the particular parameters sensed by the control of the present disclosure as the particular illustrated embodiment is merely shown for the purpose of illustration.

The typical gas turbine engine 10 includes an outer housing 30 having an air intake 32 and exhaust nozzle 34. A combustion chamber 36 having a fuel distribution ring 38 therein is located within the housing 30 between the compressor 40 and the forward turbines 42. The power plant illustrated is of the split turbine type which has its forward turbines driving the compressor 40 by means of a hollow shaft 44. The power turbine 46 may drive a propeller, or, in the case of the turboshaft engine, a gear box 48 by means of a second shaft 50 which is concentric with the hollow shaft 44. Since turboprop and turboshaft engines are basically identical, it is evident that all considerations necessary for a successful fuel control for a turboprop engine would be the same as those for a turboshaft engine fuel control. Moreover, although the instant disclosure particularly concerns a turboshaft engine fuel control, the illustrated control can easily be employed with a turboprop engine. It is, of course, to be further understood that the invention is not limited to the particular type of turboshaft engine illustrated as this is merely a general representation of a typical engine.

The fuel supply system for the engine 10 generally comprises a fuel tank 52 and a pump 54, which is usually but not necessarily driven by the engine 10, and supply conduit 56 and 58 for delivering fuel to the fuel control 12. The pump 54 may be incorporated within the fuel control itself or may be contained within a separate housing. The fuel control 12 meters the correct fuel flow for the particular engine operating requirements as dictated by the abovementioned engine speed and compressor discharge pressure parameters, in a manner hereinafter described. Correctly metered fuel is transferred to the fuel distribution ring 38 via a conduit 60, any excess fuel being bypassed back to the inlet side of pump 54 through a return passageway or bypass conduit 62 in a manner hereinafter described.

Referring now generally to FIGS. 2 and 3, the gas producer control is illustrated as comprising two sections, namely: a metering section in FIG. 2 and a computer section in FIG. 3. Obviously, these sections could be contained within a single housing or separate housings. Also, the particular elements which form each section could be contained within separate housings or a single housing.

Turning now to FIG. 2, which may be thought of as the metering section of the gas producer control, fuel from supply conduit 58 enters a main fuel supply line, generally shown at 70, formed in a plural cavity housing 71. The fuel line 70 comprises segments 72, 74, and 76. Segment 72 of main fuel line 70 embodies a barrier type filter 78 which is urged against an annular abutment 80 in the segment 72 by a spring 82. Should contaminants in the fuel clog filter 78, the increased pressure on the filter will urge it to the right against the bias of spring 82. If the pressure of the fuel emerging from the filter 78 exceeds a predetermined value, a relief valve 84 will crack open to thereby permit a flow of fuel from segment 72 to return passageway 62 (FIG. 1) via bypass line 86. Fuel from segment 72 passes through a muscles valve 88 into segment 74 and thence past a main metering valve 90 to segment 76. Metering flow from segment 76 is delivered to the power turbine governor of FIG. 4 where the fuel flow undergoes further metering before delivery to the fuel distribution ring 38.

ACCELERATION FUEL SYSTEM INCLUDING STARTING AND ENRICHMENT FUEL FLOW MEANS

The main metering valve 90 is employed to meter fuel during acceleration, gas producer governing and deceleration. Except during speed enrichment and starting, the pressure differential (BF − AF) across the metering valve 90 is held constant by the acceleration system bypass valve, generally shown at 92. Positioned in chamber 94 of metering valve 90 is a spring loaded evacuated bellows 96. The chamber 94 is subject to compressor discharge pressure ($P_c$) which is directed therein via port 98. A lever 100 is pivotally connected intermediate its ends to a fuel-air seal structure 102 serving to isolate chamber 94 from a chamber 106 which contains fuel. The structure 102 is provided with an overboard drain 108 to prevent fuel from seeping into chamber 94. The right end 110 of lever 100 bears against the upper portion of bellows 96 and the left end of lever 100 engages a recessed portion of valve 112 so that the movements of the lever 100, produced by variations in compressor discharge pressure ($P_c$), may be transmitted directly to valve 112. It will thus be appreciated that the chamber 94 is adapted to contain air at a compressor discharge pressure ($P_c$), whereas the chamber 106 is adapted to contain fuel.

Figure 5:
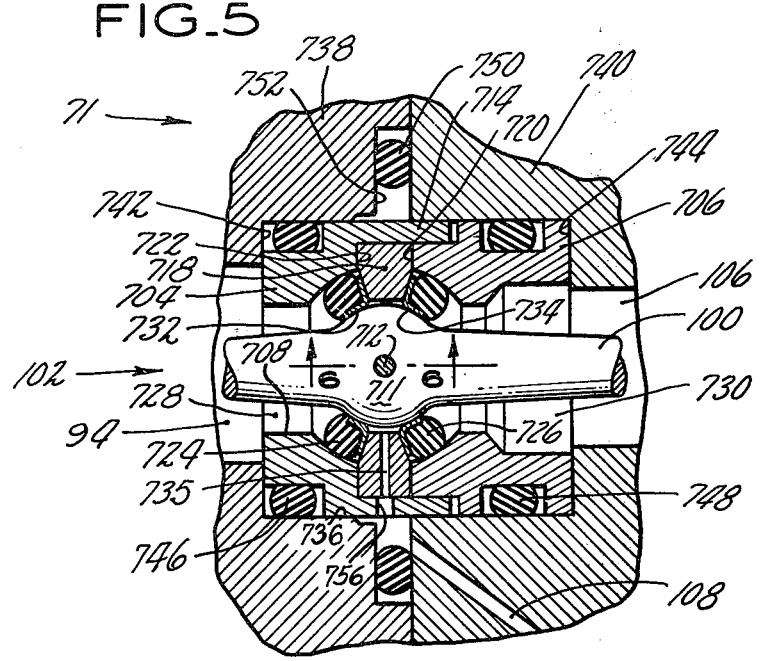
FIG. 5 is a sectional view of the fuel-air seal construction of FIG. 2.
Figure 6:
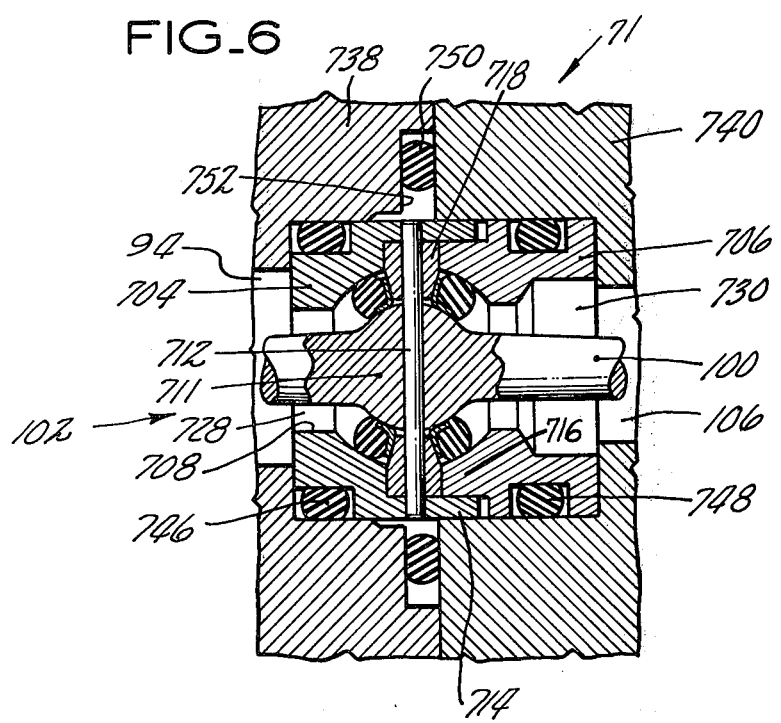
FIG. 6 is a sectional view of the fuel-air seal construction of FIG. 5, taken along the line 6—6 of FIG. 5.

Referring to FIGS. 5 and 6, there is shown the detailed construction of the seal structure 102 which comprises a housing defined by annular retainer members 704 and 706. The interior walls of the retainer members 704 and 706 form an interior chamber 708 in which the lever 100 is mounted. The lever 100 is mounted for pivotal movement about an axis within the chamber 708 by means of a pin 712 which extends through a rounded intermediate portion 711 of the lever and has its ends inserted within aligned apertures in an extension 714 of the member 704.

An extension 716 of the member 706 is received within the extension 714 such that the inner and outer peripheries of the respective extensions 714 and 716 are contiguous. A ring 718, having bevelled lateral sides surrounds the rounded portion 711 of the lever 100 and is radially spaced therefrom. The ring 718 is interposed between the members 704 and 706 in firm contact with the inboard end 720 of the structure 706 and a shoulder 722 of the member 704. As can be seen in FIGS. 5 and 6, the outer surface of the ring 718 is contiguous with the inner periphery of the extension 714 and is flush with the outer periphery of the extension 716. The ring also includes a pair of diametrically opposed apertures through which pin 712 extends. Also, it will be noted that the diameter of the chambers progressively decreases intermediately adjacent the ring 718 in both outboard directions. It will be appreciated that the ring 718 could be formed integral with either the member 704 or 706, but that a separate ring facilitates assembly of the seal 102.

A first O-ring seal 724 and a second O-ring seal 726 are interposed between the respective members 704 and 706 and the rounded portion 711, thereby defining cavities 728 and 730 which are sealed from each other. The O-rings 724 and 726 are preferably made of a fluorosilicone rubber, although any elastomeric material would obviously be suitable. In order to prevent scuffing of the O-rings when the lever 100 is pivoted about its axis of rotation, a pair of annular bearing elements 732 and 734 made of a material such as that sold under the trademark Teflon and having L-shaped cross sections, are disposed between the rounded portion 711 and the respective O-rings 724 and 726 such that the inboard sides of these elements abut the bevelled surfaces of the rings 718. It will be noted that the O-rings are immovably retained with the chamber 708 since they cannot be displaced in an outboard direction because of the chamber geometry. The ring 718 embodies a radial drain passage 735 which is adapted to drain off any liquid which might leak into the annular volume defined by the interior circumference of the ring 718, the rounded portion 711, and the elements 732 and 734.

The seal itself is contained within a recess 736 formed within two abutting main housing structures 738 and 740, which are portions of the fuel control housing 71. The members 704 and 706 are retained in close fitted engagement with the structures 738 and 740 within a central portion of the recess 736, which is cylindrical in shape. The lateral faces of the outboard ends of the members 704 and 706 abut the shoulders 742 and 744 of the structures 738 and 740, respectively, so that the end 720 and the shoulder 722 bear against the sides of the ring 718. To prevent leakage of liquid between the seal members and the structures from the cavity 106 to the cavity 94, a pair of O-rings 746 and 748 are located in suitable grooves adjacent the structures on the respective members 704 and 706. Another O-ring seal 750 is positioned in a groove 752 in the structure 738 to prevent possible leakage between the area of contact between the structures 738 and 740. The overboard drain passage 108 in the structure 740 communicates with the groove 752 radially inwardly of the O-ring 750 to drain off liquid in the groove 752. Should liquid leak past the bearing element 734 it will be ducted to the groove 752 via passage 734 and an aperture 756 in the extension 714 of the element 704.

A salutary feature of the illustrated seal design that the pivot axis of the lever 100 need not be exactly perpendicular to the axis of the lever 100 as slight deviations therefrom will not impair the seal because of the spherical shape of the rounded portion 711. Another feature is that deterioration of one of the O-rings 724 and 726 will not destroy the seal. For example, assuming that seal 726 fails, the liquid will merely flow out of the passage 735 since the seal 724 will prevent communication between cavity 728 and cavity 730. Yet another feature of the disclosed seal 102 is the reduced friction forces to which the lever is subjected. The pin mounting of the lever 100 permits the bearing surface, which the rounded portion 711 slides over, to be reduced to a minimum as it is the pin 712, not the bearing surface, which guides the pivoting motion of the lever. This latter feature significantly reduces hysteresis in the fuel control.

Valve 112 has a frusto-conical contour in the vicinity of the port 114 which fluidly interconnects the segments 74 and 76 of the main fuel supply line 70. Movements of the lever 100 are transmitted to a lower spool 116 by virtue of the fact that the end 111 of lever 100 is disposed in a recess 118 of the spool 116. The spool 116 is interconnected to the valve 112 through a detentable $P_c$ compensation spring 120. The spring 120 is confined within a cup-shaped upper portion 122 of the spool 116 by means of a spring seat 124 which is integral with the valve 112.

During acceleration the valve 112 is essentially unloaded and the preload in the compensation spring 120 allows the metering valve to follow lever position exactly. The frustro-conical contour of the valve 112 adjacent metering port 114 results in a metering area which is proportional to the displacement of valve 112. A mathematical description of the acceleration system is as follows: $W_f = C_m A_m \sqrt{P_d}$; wherein $C_m$ is a constant, $A_m$ is the metering area, and $P_d$ is BF − AF. Since $A_m$ is proportional to $P_c$ it follows that: $W_f \propto P_c \sqrt{P_d}$.

The lower portion of the spool 116 embodies a spring seat 126. A compression spring 128 is confined between the spring seat 126 and a plug 130 which is threadably inserted in the housing 71. Slideably mounted in the plug 130 is a stop 132 which is adjustable by means of a minimum flow stop adjustment screw 134. The compression spring 128 serves to urge the spool 116 upwardly against the bias imposed by the bellows 96.

As mentioned heretofore, during acceleration, a movement of the lever 100 results in a corresponding movement of the valve 112. This is due to the high preload of the spring 120 which, in essence, serves as a rigid link between spool 116 and valve 112. It should be noted at this point that during governing, the preload of spring 120 will be overcome to permit movement of valve 112 relative to the spool 116. The lower portion of the metering valve 90 is also provided with a maximum compressor discharge pressure ($P_c$) stop 136 to limit the discharge pressure which the gas producer control can sense.

Metering valve 90 is also provided with a governor platform formed by a diaphragm 138 secured to the wall of upper chamber 140. A diaphragm washer 142 is secured to the diaphragm 138, and a compression spring 144 is confined between the diaphragm washer 142 and the lower wall 146 of chamber 140. A minimum $W_f/P_c$ ratio compression spring 145, concentric with spring 144, contacts the diaphragm washer 142 and seats against a movable valve guide 148. The top portion of valve 112 extends through a centrally located bore in guide 148 so that the valve 112 follows the guide 148 as it slides along wall 150. Guide 148 is also provided with a plurality of circumferentially spaced holes 152, through which the pressure BF is communicated to chamber 140. A minimum $W_f/P_c$ ratio stop screw 154 is centrally connected to the diaphragm washer 142 and is adapted to contact flange 156 of a threadable plug 158 to limit the downward travel of the diaphragm 138, thereby limiting, to a minimum valve, the $W_f/P_c$ ratio. Valve 90 also embodies a plurality of ports 160, 162, and 164, the port 164 containing a fixed restriction or orifice 166. The functioning of these ports will be described hereinafter with respect to the governing system. It should be noted with regard to the main metering valve 90 that during acceleration the spring 145 will not contact washer 142 but will come into contact therewith when governing commences as will be hereinafter described.

Figure 10:
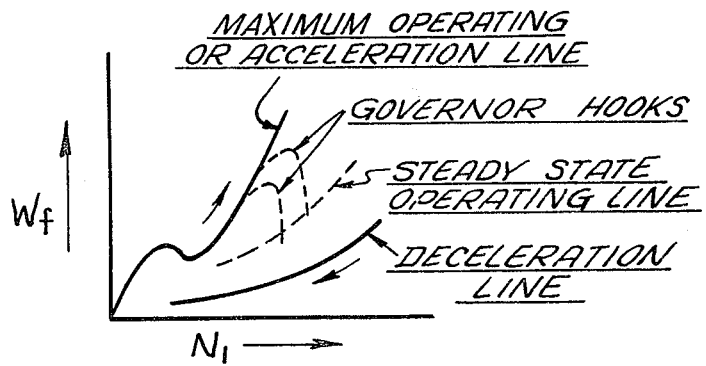
FIG. 10 is a graph illustrating the relationship of fuel flow to gas producer speed for engine operating conditions, such as acceleration, steady-state and deceleration.

In order to provide a speed dependent fuel flow schedule to meet the $W_f/P_c$ starting and acceleration requirements of the engine, the pressure differential or metering head across the main metering valve 90 is controlled by a speed ($N_1$) responsive hydraulic computer circuit. The characteristic fuel flow schedule is depicted in FIG. 10.

The main fuel path for the fuel emerging from the barrier filter 78 is through the muscles valve 88. The muscles valve 88 provides a pressure differential ($P_1$−BF) which is necessary to operate a hydraulic speed sensor, generally shown at 170. The muscles valve 88 is adapted to open only after $P_1$−BF exceeds a predetermined value (e.g., 12 psi). The muscles valve 88 is spring loaded by a spring 172 to urge the valve 88 in a direction opposite to that of the flow proceeding through the control. Initially, this spring 172 will prevent direct fluid communication between conduit 72 and conduit 74. As shown in FIG. 2A, the left or front end of the muscles valve 88 is somewhat triangular in shape and has flattened apices which slide along the walls of conduit 72 to thereby guide the valve 88.

However, a secondary flow path is provided between conduit 72 and conduit 74 by a start regulator 176, line 178, a computer mechanism 180, and line 182. The start regulator functions to hold a constant pressure differential BR−BF across the start computer mechanism 180. This pressure differential BR−BF is set at a predetermined value slightly below the value of $P_1$−BF which is sufficient to open the muscles valve 88 (e.g., 10 psi). With these pressure settings, it is evident that the muscles valve 88 will not open until the start regulator 176 is functioning. Yet another secondary flow path is defined around the muscles valve 88 by conduit 184 and the hydraulic speed sensor 170. These secondary flow paths respectively recombine with the flow in conduit 74 at ports 186 and 188 and hence no pump flow is wasted by this system. Hence, with regard to the computer mechanism 180 and the speed sensor 170 (along with a speed setting mechanism, hereinafter described), conduit 72 is a first source of fluid at a supply pressure (pressure $P_1$), and conduit 74 is a second source of fluid at a return pressure (pressure BF).

The start regulator 176 is disposed within a cavity 190 formed in housing 71. A manually adjustable plug 192 is threadably inserted in the upper portion of the cavity 190 to seal the cavity and serve as a spring seat for compression spring 194 which bears against the diaphragm washer 196 of the diaphragm 198. The diaphragm 198 divides the cavity 190 into an upper chamber and lower chamber. A port 199 formed in the wall of the housing 71 is interconnected to the conduit 74 by a line 200, thereby referencing the upper chamber to pressure BF. A port 202, formed in the housing, communicates with the lower chamber and transmits the pressure BR therein to the inlet 204 (FIG. 3) of the computer mechanism 180 via the line 178. Depending from the diaphragm washer 196 is a valve spool 206 which includes a flange 208 to restrict the flow from conduit 72 to the lower chamber of cavity 190 and thereby regulates the pressure BR such that BR−BF, the pressure imposed across the computer mechanism, remains essentially constant.

The hydraulic speed sensor 170 is disposed within a suitable cavity 210 in the housing 71. The heart of the speed sensor is a hollow cylindrical structure 212 which is rotated at speed $N_1$ by a splined shaft 214 extending from the housing 71. The end 216 is adapted to be drivingly interconnected to the shaft 20 of FIG. 1. A hollowed contoured disc 218 surrounds the shaft 214 and contacts the base of the upper splined portion 220 to urge this portion into splined engagement with the structure 212. The disc 218 is supported upon a sealing member 222 which functions as a spring seat for the spring 224 which urges the disc 218, and hence the shaft 214, in an upward direction toward the structure 212. The member 222 is in turn supported on a seal 226 which similarly surrounds the shaft 214. A cylindrical carbon bearing 228, having a seal disposed therearound, embraces upper portion 220 of shaft 214 and provides a surface upon which the structure 212 rotates. A tube 230 is slideably mounted in the cavity 210 above the structure 212 for providing a flow path from the structure 212 to conduit 74 and biasing the structure 212 in a downward direction against carbon bearing 228. A spring 232, seated against the housing 71 and tube 230, urges the lower end of the tube into firm sliding contact with the top surface of structure 212. A recess formed within the structure 212 by intersecting bores 234 and 236 contains a slideably mounted, spring loaded spool valve 238. When the gas generator is at rest and the structure 212 is not rotating, spring 240 urges the spool outwardly or to the left such that a flange 242, formed thereon, abuts the wall of bore 236, thereby limiting the outward travel of the spool. Fuel from conduit 72 proceeds into chamber 210 via a line 184 and a restriction 246. The pressure of the fuel within the cavity 210 surrounding the structure 212 is designated SS. As a duct 248 in the structure places the fuel surrounding the structure 212 in fluid communication with bore 234, the flow emerging from bore 234 into bore 236 is controlled by the flow area defined between the left side of land 243 and the intersection between the bores 236 and 234. Flow entering the bore 236 from this metering area proceeds to conduit 74 via tube 230. At the base of the structure 212 is an annular recess 250 which communicates with the cavity 210 for supplying lubricating fuel to the bearing 228.

The valve 238 is subjected to centrifugal force during rotation of the structure 212 by the shaft 214. This centrifugal force functions to increasingly restrict the flow from the bore 234 to the bore 236 until the centrifugal force is balanced by the pressure forces acting on the spool 238. In order to function, the speed sensor 170 must be subjected to a pressure differential $(P_1-BF)$ which is greater than that of the speed signal $(SS-BF)$ which it is to produce. As previously mentioned, the differential pressure $P_1-BF$ is applied to the speed sensor by the incorporation of the muscles valve 88 in the main fuel supply line. The pressure drop $(P_1-BF)$ across the muscles valve is flow sensitive and roughly proportional to gas producer speed $N_1$ plus an initial bias. Thus, the applied pressure differential across the speed sensor 170 fulfills the requirements for successful operation thereof without substantially affecting the required pump output pressure in the low flow range. The resulting pressure differential or speed signal $(SS-BF)$ is proportional to the square of the gas generator speed and is utilized as the speed signal for the gas producer governor and the computer mechanism 180. It will be noted that the above described arrangement enhances the accuracy of the speed sensor.

Figure 9:
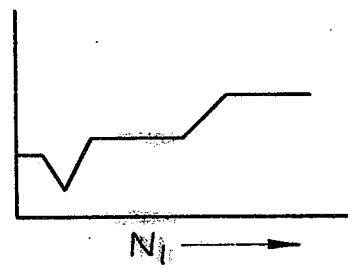
FIG. 9 is a graph showing the relationship between the pressure differential across the metering valve of the gas producer to gas producer speed.

In general, the computer mechanism varies the pressure differential $(BF-AF)$ across the metering valve 90 in accordance with the gas producer speed to fulfill starting and enrichment requirements. This relationship is shown in FIG. 9. In addition, the computer mechanism is provided with a manual means for varying the pressure differential across the valve 90 so as to forestall an excessively hot start. Referring in detail to the computer mechanism 180, the computer mechanism is comprised of an enrichment valve 260, a starting valve 262, and a manually controlled trim start valve 264. Within the housing 71 are formed cavities 266, 268, and 270 which house the enrichment and starting valves of the computer mechanism 180. Cavities 266 and 268 are fluidly interconnected by an orifice 272, and cavities 268 and 270 are similarly interconnected by an orifice 274. A diaphragm 276 divides the cavity 266 into an upper chamber and a lower chamber which respectively communicate with the chamber 210 of the speed sensor 170 and the conduit 74. Hence, the upper chamber of cavity 260 is at a pressure SS and the lower chamber thereof is at a pressure BF. The pressure SS is communicated from the speed sensor 170 to the upper chamber of cavity 266 by means of a line 278 (FIG. 2), governing system valve 280 and line 282. The pressure BF is communicated to the computer mechanism via line 182 which is connected to the outlet 284 of the computer mechanism 180.

Another line 286 fluidly communicates with cavity 268 to transmit the pressure AR therein to the differential pressure regulator 92 as is more fully described hereinafter.

A diaphragm washer 287 is connected to a spool 288 which regulates the area of the orifice 272. A nut 290 is threadably inserted over the threaded upper end of the spool 288 to securely mount the spool 288 to the diaphragm 276. The nut 290 serves as a spring seat for a compression spring 292 and the diaphragm washer 287 serves as a seat for the spring 294. The diaphragm 276 thus compares the $N_1$ speed signal $(SS-BF)$ with the spring load constituted by the difference in pressures of the springs 292 and 294. Threadably inserted in the upper part of the cavity 266 is an adjustable plug 296 which allows the spring load on the enrichment diaphragm to be varied for setting the value of the speed $N_1$ at which the start valve will begin to move. Mounted within the plug 296 is an adjustment screw 298 which determines the initial opening or zero speed opening of the start valve since at zero speed the upper portion of spool 288, of course, contacts the lower surface of the adjustment screw 298.

The spool 288 has a contoured hourglass shaped mid-portion 300 to yield the proper acceleration schedule in the idle to maximum speed region and a lower cylindrical portion 302 having a recess 304. A cylindrical cap 306, which is threadably secured to the upper end of a shaft 307, is slidably contained within the recess 304 for axial sliding movement therein against the bias of spring 308. The threadable connection between the cap 306 and shaft 307 permits the position of the enrichment valve to be varied with respect to the start valve for varying the speed at which fuel enrichment commences. An enlarged diameter portion 310 of the shaft 307 is disposed within the cavity 270 to control the area of the metering orifice 274. The lower end of the shaft 307 is slidingly received by a plug 312 inserted in the cavity 270. The plug 312 includes a central chamber 314 which communciates with duct communicates in the computer mechanism and thus provides a flow path from the inlet 204 to the orifice 274. The plug 312 also embodies an adjustment screw 318 which sets the final area of the start valve 262 and hence sets the $W_f/P_c$ level between the starting notch shown on FIG. 9 and the enrichment region. Adjustment of the plug 312 sets the total travel of the start valve and therefore determines the width of the starting notch of FIG. 9.

In operation, as the gas producer speed increases from zero initially, the pressure differential SS—BF across the diaphragm 276 correspondingly increases, thereby driving the spool 288 downwardly. The shaft 307 is also moved downwardly a corresponding distance since the spring 308 remains fully extended during this operation and acts as a rigid link between the enrichment valve and the start valve. In the low speed region, the enlarged diameter portion 310 of shaft 307 progressively decreases the restriction to flow through orifice 274 as the shaft 307 moves downwardly towards the plug 312, and thereafter, the restriction increases with increasing diaphragm displacement as the enlarged diameter portion 310 restricts flow from the outlet 320 of the plug 312. Thus, the enlarged diameter portion 310 of the shaft 307 functions (in a manner similar to that of a double flapper) in the low speed region to decrease and then to increase the restriction to flow entering cavity 268, the pressure in this cavity being designated AR. The action of the starting valve, in concert with the start regulator 96 and the bypass regulator 92, begets the notch effect in the fuel flow schedule illustrated in FIG. 10 as will be explained below. Also, in the low speed region, the enrichment valve 260 maintains a constant series restriction between the cavities 268 and 266 since the cylindrical portion 302 of spool 288 moving in the orifice 272 maintains a constant area annular flow path therethrough.

When the gas generator attains a sufficient speed, the manual trim valve 264 is in parallel to the start valve 262 and in effect permits reduction of the net restriction of the starting circuit to reduce the $W_f/P_c$ schedule in the starting region to forestall an overtemperature condition. The valve is positioned by the shaft 322 of the cutoff lever 324. The trim start valve includes a duct 326 which communicates with the duct 316 and hence receives a fuel from the computer inlet 204. When the trim start valve 264 is opened by the shaft 322, flow from duct 326 proceeds into a bore 328 after passing a spring loaded spool 330 and thence proceeds into an annular volume surrounding the lower part of the shaft 322. Flow from the annular volume enters the duct 332 which connects with cavity 268. A passage 334 in the spool 330 ports pressure behind the spool to pressure balance the valve, and an axial projection 336 contacts a cam surface 338 on the lower part of the shaft 322, whereby movement of the shaft 322 displaces the spool 330 to control the flow from the duct 326 to bore 328 to control the pressure AR in cavity 268. The trim start valve 264 may be positioned so that the spool 330 prevents fluid communication between duct 326 and bore 328 (this would normally be the position during starting), or it may be positioned to provide a varying restriction between the duct 326 and bore 328. It should be noted that the shut-off valve 672 (described hereinafter) is arranged on the shaft so that it is fully open in this position. If it is desired to decrease the fuel flow from the fuel control, valve 264 is opened and this action will increase the pressure AR, which will result in reduced fuel flow for reasons explained hereinafter. Again, the shut-off valve remains fully open during this action.

The pressure AR, generated by the computer mechanism 180, is directed to the bypass regulator 92 (FIG. 2) via conduit 286. The bypass regulator 92 is mounted within a cavity 360 of housing 71. The usual diaphragm 362 sealingly divides the cavity 360 into an upper chamber referenced to the pressure AR and a lower chamber referenced to the pressure AF by means of a duct 364 which communicates with a location downstream of the metering valve 90. A damping orifice 366 is mounted within the duct 364 to attenuate fluctuations in the pressure AF. The valve spool 368, having a flow compensating contour on the end thereof, is secured to a diaphragm washer 370 which is subjected to the urging of compression spring 372. It should be apparent that the regulator 92 is adapted to maintain the differential pressure AR—AF at a constant value by controlling the amount of fuel bypassed from segment 74 to bypass conduit 86, these flow passages being fluidly connected adjacent the end of spool 368.

Bearing in mind that the regulator 92 maintains a constant AR—AF, it can be seen that when the hourglass shaped portion 300 of the spool 288 moves into the orifice 272 to commence the enrichment function, the contour thereupon causes a decrease in the AR—BF pressure differential which progressively decreases as the speed increases, thereby providing the speed enrichment function. The speed at which enrichment commences is, of course, dependent upon the adjustment of the cap 306 with respect to the shaft 307 since this adjustment varies the position of the enrichment valve with respect to the start valve. Also, it will be appreciated that since the bypass regulator 92 maintains a constant AR—AF and since the computer mechanism determines the pressure differential AR—BF, the computer mechanism controls the metering head BF—AF across the main metering valve 90 and hence the flow therethrough for a given metering opening at orifice 114.

To briefly recapitulate, the computational stage utilizes a two orifice, series, hydraulic circuit with a relatively constant total pressure head. The two orifices are provided by the start and enrichment valves. The total pressure drop across the two valves (BR—BF) is maintained by the start regulator 176. The hydraulically transduced speed signal (SS—BF) is applied to the enrichment diaphragm 276 to position the start and enrichment valves and thereby set the intermediate pressure (BR—AR). The start valve opens and then closes with increasing speed to provide the derichment notch in the starting region and the enrichment valve yields the required engine acceleration schedule in the idle to maximum speed region. The transferral of the computed BR—AR pressure drop to the metering valve 90 is accomplished by the bypass regulator 176 and another two orifice series circuit composed of the enrichment valve and metering valve. The total drop across these two valves (AR—AF) is controlled by the bypass regulator at essentially a constant value (e.g., 10 psi). With the enrichment valve common to both the computational and transferral circuits, the metering head pressure differential (BF—AF) is forced to be equal to the scheduled pressure (BR−AR). Hence, the success of the pressure transfer stage is solely dependent on the precision of the bypass regulator 92 to duplicate the start regulator pressure setting. Therefore, flow force compensation has been designed into the bypass valve which allows the bypass regulator to essentially duplicate the start regulator characteristic over the wide range of pressure and bypass flows encountered in the flight envelope.

Gas Producer Governing System

The acceleration control includes an all speed, compressor discharge pressure ($P_c$) compensated gas producer governor. At a given setting of the throttle 14, which is associated with the speed setting valve 280, the $P_c$ compensation feature produces parallel shifts in the governor hooks without altering their slopes. The unique spring arrangement embodied in the metering valve 90 renders the governing system capable of maintaining a maximum set speed, irrespective of altitude and ambient temperature variations. The gap producer speed signal (SS−BF), generated by the hydraulic speed sensor 170, is utilized not only by the governor system, but also by the enrichment mechanism as explained heretofore. The governor system consists essentially of the speed setting valve 280 and the governor itself which is mounted in the cavity 140 of the main metering valve 90.

The speed setting valve comprises a spool 380 slideably mounted within a cavity 382 in the housing 71. The left extremity 384 of the spool 382 is contacted by a rotatable $N_1$ speed setting cam 386 which is connected to the throttle lever 14 by shaft 388 which extends through the housing 71 and is embraced by seal 390. A spring seat 392 is mounted upon the spool 380 for axial sliding movement thereover and is positioned thereupon by a pair of bimetallic, fuel temperature compensating discs 394 and 396 and a compression spring 398 which is seated upon the other side thereof. A duct 400, having a flanged end 402 which serves as a spring seat for the spring 398, is sealingly secured to a diaphragm 404 which extends, and is secured, to the wall of chamber 382. The right end of the duct 400 is adapted to slidingly contact a wall portion 405 of the chamber 382. A threaded plug 406 and the right end of the duct 400 define variable orifice 408, the size of which controls the pressure FG on the left side of the diaphragm 404 and hence the pressure in the upper portion of the chamber 140 of the main metering valve 90.

The speed setting valve 280 then has three isolated chambers defined therein, viz.: a first chamber 410 at a pressure FG; a second chamber 412 at a pressure SS; and a third chamber 414 which surrounds the orifice 408. The line 416 fluidly interconnects the segment 72 of the main fuel supply line with the chamber 414 and hence the orifice 408. The chamber 412 is placed in communication with the signal pressure SS via the line 278, and the chamber 410 communicates with the upper side of the diaphragm 138 through line 418. It should be noted at this point that the upper surface of the diaphragm 138 of the main metering valve 90 communicates with the conduit 74 adjacent orifice 114 by means of the line 164. It should be apparent that when the orifice 408 is closed — that is, when the right end of the duct 400 abuts the plug 406 — the pressure FG in the chamber 410 will equal BF. It should be noted at this point that before governing commences, the orifice 408 will be closed and, therefore, during this period, the actual $N_1$ speed signal (SS−BF) is maintained across the spring loaded diaphragm 404 of the speed setting valve 280. The spring loaded diaphragm 404 regulates the valve opening to hold the pressure differential thereacross (SS−FG) proportional to the spring load which is set by the throttle actuated speed setting cam 386.

When the orifice 408 opens during governing, the pressure FG increases. A pressure drop FG−BF is then occasioned across the orifice 166, which also exists across the governor diaphragm 138. Since the pressure differential (SS−BF) is proportional to the actual gas producer speed ($N_1$) squared and the pressure differential (SS−FG) is proportional to the set speed ($N_1$) set squared, it should be apparent that the pressure differential FG−BF across the governor diaphragm is proportional to $N_1^2 - N_1^2$ (set). Therefore, the pressure differential across the governor diaphragm 138 is a function of speed error. The force exerted on the diaphragm 138 by this pressure differential is counteracted by the governor spring 144. The resultant force upon the governing diaphragm 138 is transmitted to the valve 112 through the minimum ratio spring 145, which is initially contacted as governing commences. Hence, it will be appreciated that during governing, in addition to the $P_c$ bellows systems and the springs associated therewith, there are three springs (144, 145 and 120) acting to position the metering valve 112.

As was previously set forth with reference to the acceleration fuel system, the CDP compensation spring 120 performs a dual task, in that during acceleration, the preload in the spring provides an essentially rigid link between the bellows lever 100 and the fuel valve 112, whereas during governing, the governor force overcomes the preload in the spring 120 and displaces the valve 112 relative to the bellows lever position. It should be noted that once the valve 112 has been detented, the amount of force transmitted to the governor system for a change in the compressor discharge pressure ($P_c$) is solely dependent upon the rate of the compensation spring 120. Typical governor hooks are shown in FIG. 10. The initial departure from the acceleration schedule at the beginning of the governor hook is caused by the slight extension of the bellows as the governor force increases but has not yet reached a force level equal to the preload in the $P_c$ compensation spring 120.

Referring back to the speed setting valve 280 in FIG. 3, an idle stop screw 420 is interposed between the lands 422 and 424 of the spool 380, the stop screw 420 being adapted to contact the land 424 to prevent governing at a speed below that of idle.

Gas Producer Control Deceleration System

When the actual engine speed ($N_1$) is much greater than the desired operating speed, the speed error pressure (FG−BF) attains a value which is sufficient to drive the minimum ratio stop screw 154 against the flange 156 of plug 158. In this condition, the governor collapse mechanism is partially detented, and the valve 112 is positioned by the displacement of the $P_c$ bellows 96. For a constant metering head, fuel flow is proportional to $P_c$ and is biased by the position of the minimum ratio stop. During actual engine operation the metering head varies as per the enrichment schedule, thereby varying the proportionality constant between $W_f$ and $P_c$ as a function of $N_1$.

The minimum valve position stop 132 (which contacts the lower tip of valve 112) overrides the deceleration schedule at very low $P_c$ pressures. The absolute level of minimum flow is a function of the valve stop position and metering head, the latter varying as a function of $N_1$.

Power Turbine Governing System

Figure 4:
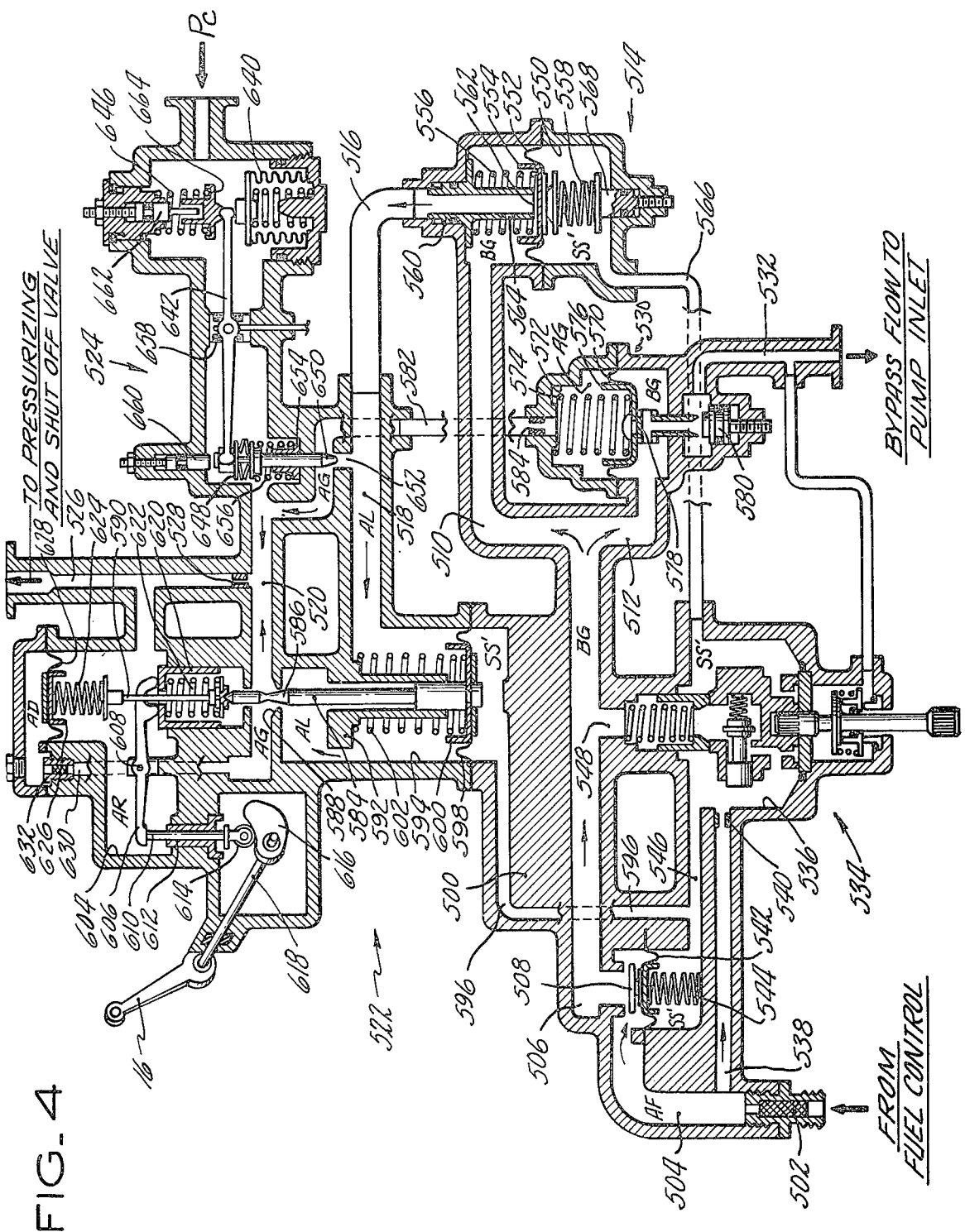
FIG. 4 is a schematic illustration of the power turbine governor.

Turning now to FIG. 4, there is shown a power turbine governor which comprises a plural cavity housing 500 formed in any suitable manner. The power turbine governor generally includes speed sensing means to sense speed $N_2$, a speed setting mechanism to set speed $N_2$ (set), a fuel flow reset governor, an overspeed limiter, and a deceleration system. Fuel emerging from the segment 76 of the fuel control enters the power turbine governor through a barrier filter element 502. Flow from the filter element 502 enters conduit 504 and proceeds thence to a conduit 506 via a muscles valve 508 which provides the necessary pressure differential to operate the speed sensing means as will be described hereinafter. Conduit 506 bifurcates to define conduits 510 and 512 which respectively carry fuel to the engine and the inlet side of pump 54. Fuel from conduit 510 passes through an overspeed limiting valve 514 to a conduit 516 which fluidly interconnects the valve 514 with conduit 518. Fuel from conduit 518 enters a conduit 520 via parallel flow paths defined by a governor valve 522 and a deceleration valve 524. Flow proceeds from conduit 520 to conduit 526 via a reset orifice 528 incorporated in conduit 526. Bypass flow in the conduit 512 passes through the bypass valve 530 to a conduit 532 which communicates in turn with conduit 86 via a suitable interconnection (not shown).

A speed sensor 534 is positioned within a cavity 536 in the housing 500. The speed sensor 534 is identical in construction to the gas producer control speed sensor 170; however, the operating pressure head across the speed sensor 534 is maintained in a manner slightly different from that of the sensor 170. The splined shaft of the sensor 534 is drivingly connected to the power turbine by means of transmission line 24 shown in FIG. 1. The speed signal, which is the differential pressure $SS'-BG$ generated by the speed sensor 534, is a function of the power turbine speed ($N_2$) squared. A conduit 538, embodying an orifice 540 therein, connects the conduit 504, which is at a pressure AF, with the cavity 536, which is at a pressure $SS'$. Hence, flow from the conduit 504 passes through conduit 538 to cavity 536 and thence to conduit 506, which is at a pressure BG.

Turning back to the muscles valve 508, it can be seen that the valve itself is mounted upon a diaphragm 542 which is spring loaded by a compression spring 544 to urge the valve 508 upwardly or towards the conduit 506 to restrict flow between conduits 504 and 506. The under side of the diaphragm 502 communicates with cavity 536 via line 546. Hence, the upper side of the diaphragm is exposed to a pressure AF and the lower side to a pressure $SS'$. It should be apparent that the muscles valve 508 will tend to maintain the pressure differential $AF-SS'$ at a constant value. Further, since the pressure differential $AF-BG$ is equal to the sum of the pressure differentials $AF-SS'$ and $SS'-BG$, it will be appreciated that the pressure differential $AF-BG$ will be a constant value above the pressure differential $SS'-BG$. Since all of the flow from the muscles valve 508 and the speed sensor 534 combine at 548, there is no metered flow from the gas producer fuel control wasted by the speed sensing device 534.

The flow from conduit 510 to conduit 516 must pass through the overspeed valve 514, but in an underspeed condition, there is practically no pressure drop across the valve 514, and hence, the pressure BG is substantially equal to the pressure AL in conduit 518. The overspeed limiting valve is disposed within a cavity 550 and comprises a diaphragm 552 secured to a diaphragm washer 554 which is subjected on its upper side to a force exerted thereupon by compression spring 556, and on its lower side to the force exerted by compression spring 558. A flanged duct 560 is sealingly positioned within the upper portion of the cavity 550 and depends therefrom. The inlet 562 of the duct 560 receives flow from the upper portion of the chamber 550. To insure a minimum flow therethrough to conduit 516, the wall of the duct 560 incorporates a minimum flow port 564. The spring preload, exerted upon the diaphragm washer 554 by the springs 558 and 556, maintains the end 562 of duct 560 spaced a sufficient distance from the diaphragm washer 554 so that essentially no pressure drop is engendered across the valve; that is, BG is maintained substantially equal to AL. The lower part of the cavity 550 communicates with chamber 536 by means of an interconnecting line 566, and thus the upper part of the diaphragm 552 is exposed to the pressure BG, while the under side of the diaphragm is exposed to the pressure $SS'$.

When the speed signal $SS'-BG$ is sufficient to overcome the preload exerted on the diaphragm by the springs 558 and 556, the diaphragm washer 554 will move toward the end 562 of the duct 560 to thereby produce a pressure drop between conduit 510 and conduit 516 and a consequential reduced fuel flow through the governor valve 522 as will be explained hereinafter. A plug 568 mounted in the lower part of the cavity 550 is adjustable to vary the preload on the diaphragm, and hence the speed ($N_2$) at which overspeed regulation commences.

The primary flow path from the conduit 518 to conduit 520 is through the governor valve 522, a secondary flow path being through the deceleration valve 524, which is in parallel to the path through the governor valve. The pressure differential $AL-AG$, which exists across the governor and deceleration valves, is maintained substantially constant by the bypass valve 530 in the absence of an overspeed condition.

The bypass valve 530 comprises a diaphragm 570 which extends across the cavity 572. The diaphragm is biased in the downward direction by a compression spring 574 seated upon the diaphragm washer 576. A depending structure 578 secured to the diaphragm washer provides a flow path from the conduit 512. The lower or outlet end of the structure 578 is disposed adjacent the top of an adjustable plug 580 so that the vertical position of the structure 578 is determinative of the flow therethrough to the conduit 532. The under side of the diaphragm 570 directly communicates with the conduit 512 and is thus referenced to pressure BG. The upper side of the diaphragm 570 is referenced to the pressure AG, that is, the pressure in conduit 520, by means of an interconnecting line 582 which embodies a damping orifice 583. The bypass valve serves to maintain a substantially constant differential between the pressures BG and AG by by-passing more flow to the conduit 532 when $BG-AG$ increases above a predetermined level and, conversely, bypassing less flow when BG—AG decreases below the predetermined level. As previously stated, since BG will normally be equal to AL, the bypass valve will normally maintain a constant differential pressure AL—AG, which is, of course, the metering head across the governor valve 522 and the deceleration valve 524.

The governor valve itself comprises a spool 584, having a bevelled metering surface 586 thereupon, which is movable within a metering orifice 588, the orifice 588 interconnecting the conduits 518 and 520. The upper point or extremity of the spool 584 is received within a recess in a flanged shaft 590. The various pressure forces and spring forces exerted upon the spool 584 and the shaft 590 determine the position of the bevelled surface 586 of spool 584, and hence, the metering area of the orifice 588. The spool 584 is slideable within a guide 592, axially disposed in the cavity 594. The lower part of the cavity 594 is referenced to the pressure SS′ by means of a line 596 which interconnects the line 546 and cavity 594. A diaphragm 598 is secured to the wall of the cavity 594 to thereby reference the under side of the diaphragm 598 to the pressure SS′. Upon a diaphragm washer 600 is seated a compression spring 602, coaxially mounted with respect to the spool 584 and the guide 592. The upper side of the diaphragm 598 is referenced to the pressure AL since the cavity 594 directly communicates with conduit 518. Therefore, the lower extremity of the spool is subjected to the force of spring 602 and the force engendered by the pressure differential SS′— AL across the diaphragm 598.

In an upper cavity 604, wherein the shaft 590 is disposed, a lever 606 is pivotally mounted at 608 to transmit the $N_2$ (set) speed, as set by the power turbine throttle lever 16, to the governor valve. A shaft 610 bears against one end of the lever and is slideable within a sleeve 612. The lower end of the shaft 610 has a roller 614 mounted thereupon which contacts a cam structure 616, which, in turn, is interconnected to the throttle lever 16 by means of a rotatable shaft 618. Hence, the rotation of the throttle lever 16 serves to position the lever 606. The other end of the lever 606 abuts a spring seat 620 slideably mounted within the cavity 604. It will thus be appreciated that movement of the throttle lever is directly transmitted to the spring seat 620 via the interconnecting linkage heretofore described. A compression spring 622 is interposed between a flange on the shaft 590 and the spring seat 620 to vary the force exerted upon the spool 584 when the throttle lever 16 is displaced. On the upper end of the shaft 590, another compression spring 624 is seated for transmitting yet another force to the spool 584. The upper end of the spring 624 is seated upon a diaphragm washer 626 of a diaphragm 628 which extends across the upper part of the cavity 604.

Fuel at a pressure AG in the conduit 520 is communicated to the upper surface of diaphragm 628 via a line 630 which incorporates an orifice 632. The orifice 632 acts as a damping restriction, and it will be appreciated that under steady-state conditions, the pressure AG will be equal to the pressure AD on the upper surface of the diaphragm 628. The pressure AR′ in the cavity 604 is determined by the pressure drop across the series restriction 528, which is also influenced by some flow around the upper portion of the spool which proceeds directly from conduit 520 to cavity 604.

To illustrate the operation of the fuel flow reset governor valve 522, assume that the load imposed upon the power turbine is removed, thereby resulting in an increase in the actual turbine speed ($N_2$). The speed signal (SS′—AL) across the diaphragm 598 then tends to displace the spool upwardly against the preload to reduce the area of the metering orifice 588. Simultaneously, the bypass valve 530 acts to maintain a constant pressure drop (AL—AG) across the governor by bypassing more fuel, thereby reducing the engine fuel flow in conduit 526. It will be noted that operation up to this time resembles that of a purely proportional governor, except for the change in fuel flow, which is smaller than that for the desired fuel flow to speed relationship.

Since a reduced fuel flow from the conduit 520 to the conduit 526 results in a reduced pressure drop (AG—AR′) across the orifice 528 (this pressure drop being a function of metered flow), the fuel flow responsive pressure differential (AD—AR′), applied across the reset diaphragm 628, is thereby diminished. It should be noted at this point that the reset spring load is equal to and opposite from the pressure load of the reset diaphragm and is also additive to the governor spring load. Thus, as the pressure differential (AG—AR′) across the orifice 528 decreases, because of the decreased fuel flow, the decreased pressure force (AD—AR′) on the reset diaphragm 628 allows the reset spring 624 to expand and thereby reduce its load on the spool 584, the rate of reset being determined by orifice 632. This action causes an additional travel of the governor valve in the closing direction and occasions a further reduction of fuel flow to the engine. This sequence of events continues until equilibrium is established between the pressure forces and spring forces acting on the spool 586.

The speed error ($N_2$ set-$N_2$), which exists when equilibrium is attained, is dependent on the governor parameters. For example, if the reset orifice 528 is adjusted such that a change of one unit of fuel flow causes a pressure change which, in turn, demands one more unit of fuel flow, the power turbine governor will function until $N_2$ set = $N_2$ (isochronous operation); if the ratio of reset flow to proportional flow is made less than 1, the governor will possess a conventional positive droop; and if the ratio is greater than 1, the governor droop will be negative.

The adjustable restriction 632 permits the performance of the power turbine governor to be optimized since the dynamic characteristics of the governor can be varied. The restriction 632 is externally adjustable and can be rotated to increase or decrease the restriction to flow presented thereby to respectively increase or decrease the time period during which the reset action takes place. The apparent reset time constant can be varied from a few milliseconds to many seconds and is much greater than the actual time constant of the damped reset diaphragm chamber.

For an acceleration transient, the main governor valve 584 is forced to its wide open position. In this condition, the bypass regulator valve 530 is closed and the total input flow from the gas producer control is passed through the power turbine governor to the engine. When the new operating point is approached, and power turbine speed recovers to the desired setting, the governor valve gradually closes. Thus, inlet flow passing through the restricted metering orifice 588 creates a pressure drop which opens the bypass regulator valve 530. A portion of inlet flow is then bypassed and the remainder of the flow, which is needed to sustain the operating condition, is metered to the engine.

The rate at which flow is changed during governing is determined by the governor gains. The fuel flow reset feature of the governor is a positive feedback device which steepens the overall governor gain for accurate speed regulation. This path is dynamically lagged for stability reasons to control the slewing velocity of the reset diaphragm. As applied to a helicopter installation, the amount of rotor system torsional damping is controlled by the instantaneous gain (i.e., $W_f/N_2$, with $P_c$ and AD—AR' constant).

The metering valve, springs, and other hardware associated with the instantaneous gain are designed to provide adequate torsional stability margin for a typical helicopter over its flight envelope.

Power Turbine Deceleration System

Deceleration fuel flow is a linear function of compressor discharge pressure ($P_c$) which is sensed by an evacuated, spring loaded bellows assembly 640. The right end of a lever 642 is kept in firm contact with the bellows assembly 640 by means of a spring seat 644 which retains a compression spring 646. The left end of the lever 642 rests upon a flange structure 648, which is, in turn, slideably disposed in a spool 650. A pair of bimetallic discs are interposed between the flange structure 648 and the spool 650 to compensate for the changes in fuel density. The spool 650 has a tapered end which controls the metering area of the orifice 652 and is axially slideable within a bushing 654. A compression spring 656 is interposed between the housing 500 and a flange on the spool 650. A seal 658, identical to the seal 102 of FIG. 2, serves to pivotably mount the lever 642 and separate the fuel in the left-hand chamber from the air (at pressure $P_c$) in the right-hand chamber. Stops 660 and 662 control the minimum and maximum travel of the spool 650 and, hence, the minimum and maximum valves of the metering area of the orifice 652.

The decleration valve 524 is adapted to maintain a constant minimum ratio between fuel flow $W_f$ and compressor discharge pressure $P_c$ at all flight conditions. Although the valve 524 is included in the power turbine governor for deceleration, it should be apparent that it will steadily increase fuel flow during acceleration as compressor discharge pressure $P_c$ increases with increasing speed, and the contour of the spool 584 must compensate for this functioning. If the power turbine governor is associated with gas turbine engines, wherein a minimum flow stop or equivalent device on the governor valve 522 is sufficient to prevent flameouts, the deceleration valve 524 may be entirely eliminated from the system. Hence, during deceleration, a certain minimum fuel flow will proceed from the conduit 518 to conduit 520 and thence to the engine, thereby avoiding the possibility of a flameout.

Turning now to FIG. 3, fuel from the conduit 526 metered by the power turbine governor passes to a conduit 670 and, thence, to a shut-off valve 672 via a spring loaded pressurizing valve 674. The shut-off valve 672 is integral with the shaft 322 and rotatable therewith since the housing 676 thereof is attached to the shaft 322 by a bolt 578. Flow emerging from the shut-off valve 674 enters a conduit 680 and proceeds from there to the fuel distribution ring 38 of FIG. 1.

General Operation of Fuel Control

Figure 7:
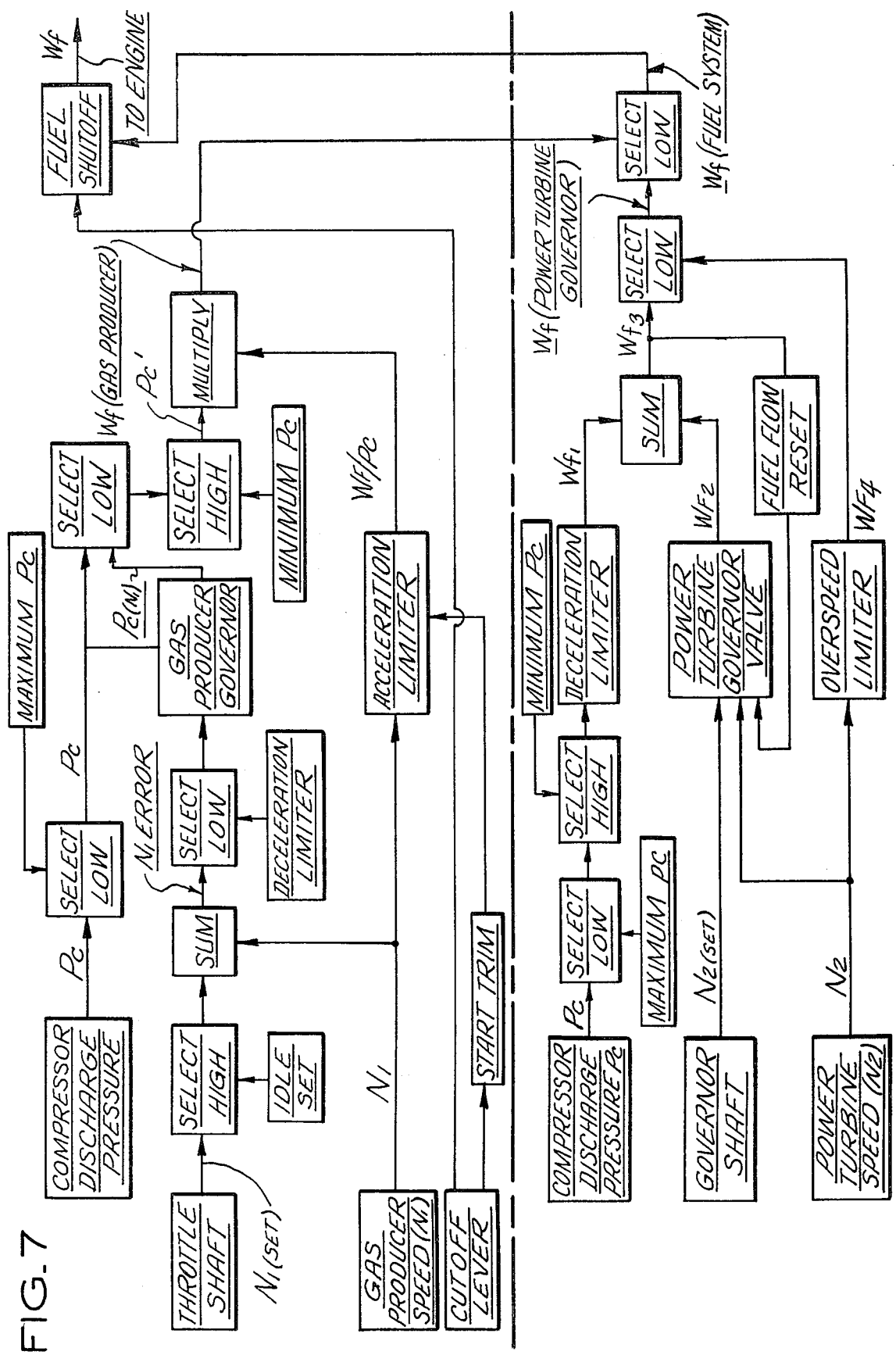
FIG. 7 is a functional block diagram of the fuel control of FIG. 1, illustrating the operation thereof.

The functional block diagram of FIG. 7 in conjunction with FIGS. 1, 2, 3 and 4 should contribute to an understanding of the heretofore described fuel control.

The gas producer control schedules the pressure differential (BF—AF) across the main metering valve as a function of $N_1$ speed varied $W_f/P_c$ ratio units. For acceleration, the main metering valve opening ($P_c'$) is directly related to compressor discharge pressure ($P_c$). Thus, engine fuel flow is metered on a $W_f/P_c \times P_c$ relationship. During all other operating modes of the control, the $P_c$ signal is biased by $N_1$ speed, and therefore, fuel flow is metered on a $W_f/P_c \times (P_c + \text{constant})$ basis.

The power turbine governor utilizes a relatively constant pressure differential (AL—AG) across two metering valves 584 and 650 which are in parallel. Therefore, total fuel flow is directly proportional to both the governor and deceleration metering valve openings. The governor valve is positioned by speed ($N_2$), total metered flow ($W_f$), and throttle (16) position. During an engine deceleration, the governor valve is shut off by the above variables and total flow is metered through the deceleration valve. The deceleration valve is linearly positioned by compressor discharge pressure and, thus, deceleration flow is metered as a unique function of engine $W_f/P_c$ ratio units.

Referring to FIGS. 2, 3, and 7, the throttle shaft lever 14 is utilized to set the desired gas producer speed ($N_1$ set). This set speed is compared with the speed set by the idle-stop 420 in the speed selector valve 280 and the highest of the two set speeds is selected. The resultant selected speed is summed with the actual speed ($N_1$) in the speed selector valve 280 to produce an $N_1$ error signal. This $N_1$ error signal, which is the pressure differential FG—BF in the metering valve 90 of FIG. 2, is compared within the valve with the signal from the deceleration limiter which comprises the minimum ratio stop 154 and 156, and the minimum ratio spring 148. The lower of the signals from the deceleration limiter and the $N_1$ error signal is the input to the gas producer governor, the input in effect serving to determine the area of the metering orifice 114. The output of the gas producer governor can be considered as representative of a compressor discharge pressure. The actual compressor discharge pressure ($P_c$) is compared with a set maximum compressor discharge pressure within the bellows assembly of the metering valve 90, and the lowest of these inputs is compared with the output of the gas producer governor. The lower of the $P_c$ signals from the gas producer governor and the bellows assembly is compared with a minimum compressor discharge pressure ($P_c$), which is determined by the position of the stop 134, and the highest thereof ($P_c'$, which is a valve opening) selected for the multiplication process with the fuel flow compressor discharge pressure ratio produced by the acceleration limiter. The acceleration limiter receives, as its primary input, a signal SS—BF, which is representative of the actual gas producer speed ($N_1$). The metering valve 90 multiplies the $W_f/P_c$ ratio produced by the acceleration limiter with a value of compressor discharge pressure as modified in a manner explained heretofore, thereby producing a fuel flow $W_f$ (gas producer) which proceeds from the segment 76 to the power turbine governor of FIG. 4.

Turning now to the lower part of FIG. 7, it can be seen that the lower of the actual compressor discharge pressure and a maximum value as set by the stop 660 is compared with the minimum value of compressor discharge pressure as set by the stop 662, and the highest thereof selected to position the deceleration valve 524 of the deceleration limiter. The deceleration limiter produces a certain fuel flow $W_{f1}$ in the power turbine governor itself. The actual power turbine speed $N_2$ and the power turbine speed $N_2$ set, as set by the lever 16, are compared by the power turbine governor valve, which also produces a fuel flow $W_{f2}$. $W_{f2}$ is summed with the output $W_{f1}$ of the deceleration limiter of the power turbine governor to produce a resultant fuel flow $W_{f3}$. It will be remembered also that the fuel flow reset feature of the power turbine governor valve is sensitive to this output and serves to reposition the valve in a manner explained heretofore. The actual power turbine speed $N_2$ is also directed to the overspeed limiter constituted by the valve 514, which yields an output fuel flow $W_{f4}$. The sum of the outputs of the power turbine governor valve and the deceleration limiter ($W_{f3}$) is compared with the fuel flow output of the overspeed limiter ($W_{f4}$) in the power turbine governor and the lowest thereof selected. Since the gas producer control and the power turbine governor are in series flow relationship, that is, all the flow from the gas producer control must enter the power turbine governor, the lower of the fuel flows commanded by these components is the final fuel flow to the engine — thus fuel flow traversing the fuel shut-off valve.

While only a preferred embodiment of the invention has been shown and described. It should be understood that various modifications and substitutions may be made by those skilled in the art without departing from the spirit and scope of the invention as defined in the subjoined claims.

Further, it is to be understood that the invention has been described by way of illustration rather than limitation.

What is claimed is:

1. In a fuel control for a gas turbine engine with a gas producer and a power turbine, a power turbine governor comprising:
    an inlet for receiving fuel from a gas producer control;
    an outlet for delivering fuel to the engine;
    conduit means to fluidly interconnect the inlet and the outlet for providing a path for fuel flow;
    sensor means to generate an actual speed signal representative of the speed of the power turbine;
    speed setting means to generate a set speed signal for the power turbine;
    governor valve means responsive to the actual speed signal and the set speed signal to meter fuel flow in the conduit means;
    overspeed valve means responsive to the actual speed signal to present a restriction to fuel flow in the conduit means upstream of the governor valve means when an overspeed condition of the power turbine arises; and
    regulator means to maintain a substantially constant differential pressure between locations in the conduit means upstream of the overspeed valve means and downstream of the governor valve means by bypassing fuel, the overspeed valve means not presenting a substantial restriction to fuel flow until an overspeed condition arises, whereby the regulator means maintains a substantially constant differential pressure across the governor valve means during normal operation and governing and whereby the overspeed valve means causes the regulator means to bypass more fuel when an overspeed condition arises to thereby reduce fuel flow to the governor valve means.

2. In a fuel control for a gas turbine engine with a gas producer having a compressor and a power turbine, a power turbine governor comprising:
    an inlet for receiving fuel from a gas producer control;
    an outlet for delivering fuel to the engine;
    conduit means to fluidly interconnect the inlet and the outlet for providing a path for fuel flow;
    sensor means to generate an actual speed signal representative of the speed of the power turbine;
    speed setting means to generate a set speed signal for the power turbine;
    governor valve means responsive to the actual speed signal and the set speed signal to meter fuel flow in the conduit means;
    regulator means to maintain a substantially constant differential pressure between first and second locations in the conduit means respectively upstream and downstream of the governor valve means; and
    deceleration valve means sensitive to the pressure discharged by the compressor to provide a flow path in parallel with the conduit means to bypass flow around the governor valve means to insure a minimum fuel flow to compressor discharge pressure ratio during deceleration, the differential pressure across the deceleration valve means being the same as that across the governor valve means.

3. A power turbine governor, as defined in claim 2, further including:
    overspeed valve means responsive to the speed signal to present a restriction to fuel flow in the conduit means at a third location intermediate the first location and the governor valve means when an overspeed condition of the power turbine arises, the overspeed valve means not presenting a substantial restriction to fuel flow until an overspeed condition arises whereby the regulator means maintains a substantially constant differential pressure across the governor valve means and the deceleration valve means during normal operation and governing and whereby the overspeed valve means causes the regulator means to bypass more fuel when an overspeed condition arises to thereby reduce fuel flow to the governor valve means and the deceleration valve means.

* * * * *